Sept. 8, 1970　　　　　　K. G. AHLEN　　　　　　3,527,063
SERRATED COUPLINGS

Filed Aug. 22, 1968　　　　　　　　　　　　3 Sheets-Sheet 1

United States Patent Office 3,527,063
Patented Sept. 8, 1970

3,527,063
SERRATED COUPLINGS
Karl Gustav Ahlen, Stockholm, Sweden, assignor to S.R.M. Hydromekanik AB, Stockholm-Vallingby, Sweden, a company of Sweden
Filed Aug. 22, 1968, Ser. No. 754,657
Claims priority, application Germany, Sept. 2, 1967, S 111,671
Int. Cl. F16d *3/06*
U.S. Cl. 64—23    17 Claims

ABSTRACT OF THE DISCLOSURE

A transmission shafting having relatively axially displaceable members comprising a pair of intermeshing serrated members. Flank elements extend from one member against the serrations of the other member to eliminate play between the members. The flank elements are biased to maintain the members in mesh in the driving direction.

---

The invention relates to serrated connections having axial displaceability between coupled elements in a drive shafting normally rotating unidirectionally, and is mainly concerned in eliminating the peripheral play normally unavoidable in such connections. In addition, the invention is also concerned with the automatic mutual centering of the coupled elements under all operating conditions.

Serrated connections are used frequently for coupling a hydrodynamic gearing to a prime mover, especially to an internal combustion engine. The flywheel of the engine carries one toothing of this type of coupling, engaging with a corresponding toothing located on the rotating housing of the hydrodynamic torque converter. The serrated coupling provides simple conditions for assembly, allows with complete rigidity axial movement limited in the peripheral direction between the coupled elements, such as is necessitated mainly by temperature influences, and does not require an accurate coaxiality of the coupled elements, which can never be achieved in practice.

In these properties, the serrated coupling is superior both to simple flange mountings with transverse bolts and to flexible disc or star couplings. Although flange mountings are also peripherally rigid, they require, in order to prevent distortion, accurate alignment of the axes of the elements to be coupled, and permit no relative axial movements with changing temperatures. Flexible disc and star couplings, on the other hand, permit small angles between the axes as well as limited axial movements, but a certain resilience in the peripheral direction cannot be prevented. In addition, both these types of couplings are complicated and time-wasting in assembly and occupy much space.

In a serrated coupling, undesirable axial stresses of the bearings can be avoided and easy assembly can be ensured only if the teeth interengage without press fit. In view of the unavoidable manufacturing tolerances and the necessary allowances for thermal expansion, this causes a certain peripheral play between the serrations.

The torque of a prime mover, and particularly of an internal combustion engine, is not constant. This torque pulsates considerably, especially during the cold starting of an internal combustion engine, resulting in a non-uniform rotational motion. Also the counter moment of the parts to be driven, such as the wheels of a vehicle, is not constant. Thus, especially where the hydrodynamic-mechanical gearing has a direct coupling and the same is connected, there may occur substantial torsional vibrations and these may reverse the moment of engagement temporarily. The unavoidable play between the teeth leads to impact shocks of the coupled elements, resulting in undesirable noise and, due to the impact of the tooth flanks, in the gradual destruction of the connections between the coupled parts and the connected auxiliary machines.

This disadvantage cannot be avoided even by known lubrication of the tooth flanks. Although the oil film dampens partly the impact stresses, this damping is not enough for eliminating fully and reliably the destructive effects of the still present impact stresses.

To produce this result is the object of the invention, according to which a part of the flanks of the serrations in at least one of the interengaging toothings is mounted on spring elements which are biased in the direction opposite to the peripheral forces acting on the toothing.

In some cases and under certain working conditions, there may occur a reversal of the direction of the torque to be transmitted by the serrated coupling. This is the case mainly in vehicle drives, where the vehicle rolls downhill under the action of the force of gravity and the engine is used for braking. However, in general the torque to be transmitted in the reverse direction is usually substantially smaller than the torque under normal conditions. To ensure that the tooth flanks are not lifted off during such a torque reversal and no impact stresses of the serrations occur during transition to normal driving conditions, the arrangement for eliminating tooth play according to the invention is so constructed that the bias of the spring elements corresponds at least in magnitude to the braking moment to be transmitted when the engine is used for braking.

The tooth flanks may have any known flank shape. In applications where no additional centering effect of the serrated coupling is required, also straight tooth flanks with radial or at least substantially radial profile can be used. Such tooth flanks have a certain centering effect when under load. An accurate centering, such as is required where at least one of the elements to be coupled is mounted floatingly, such as for example the rotating housing of a hydrodynamic gearing, necessitates however in most cases the use of flank profiles deviating from the radial direction, and particularly of evolute or similar profiles. In this case, the invention provides good centering also in the absence of load or driving moment. This is important especially for high speed installations. Preferably, the spring bias has such a value that the centering force exerted by it exceeds the unbalances of the unmounted coupling element. In spite of this high bias, the axial mobility of the coupled elements remains unimpaired. Preferably, the tooth flanks carried by the spring members have an evolute profile, corresponding to the profile of a spur gear located in the ideal pivoting centre of the bent spring. Owing to this configuration, the tooth flanks on the bent springs and on the counter-toothing make surface contact and not merely edge contact at the tip or root of the tooth, which might result in inadmissible surface pressures.

Preferably the tooth flanks carried by the spring elements form part of the external toothing. This facilitates the maintenance of an oil charge for lubricating the tooth flanks, and to this end, according to a further feature of the invention, the element carrying the internal toothing overlies the other element with a sealing collar or flange provided adjacent to the internal toothing. The oil film formed by an oil charge in the sealed toothing serves merely for reducing the forces needed to effect an axial movement between the coupled elements and for preventing electronic corrosion phenomena from occuring at the flanks of the teeth. On the other hand, the object of damping impact stresses has been eliminated because these have been prevented by the construction itself. Preferably the collar on the element carrying the internal toothing cooperates with an O-ring on the other element so as to reduce the frictional forces at the seal whilst maintaining the perfect action of the sealing arrangement.

According to another feature of the invention, the spring elements are formed by bent springs arranged in recesses of the element carrying the associated toothing, and whose radially directed, free, ends have at least on one side a tooth flank profile.

According to yet another feature of the invention, the assembly of the serrated coupling may be substantially simplified by means of adjustable abutments, by which the spring elements may be biased before the engagement of the serrations beyond the bias needed for the normal operating condition. In order to return these abutments after the first engagement of the serrations during the meshing into their inoperative position, the abutment means are formed preferably by levers mounted on the spring elements and pivotal in the axial direction of the serrations, which levers on the meshing of the serrations may be pivoted by the element carrying the other serrations from a position wherein the bent spring is depressed by an abutment surface into a position in which the bent spring is free. A particularly simple construction of the abutment means is obtained by making the pivotable levers themselves of spring material and providing projections reinforcing the free ends in the recesses of the toothing, which engage during the meshing of the serrations into recesses or holes within the bent springs.

The invention will be hereinafter more fully described by way of example with reference to an embodiment thereof shown in the accompanying drawing, in which.

In the drawings, similarly formed or similarly acting parts are denoted by the same reference numerals.

Figure 1:
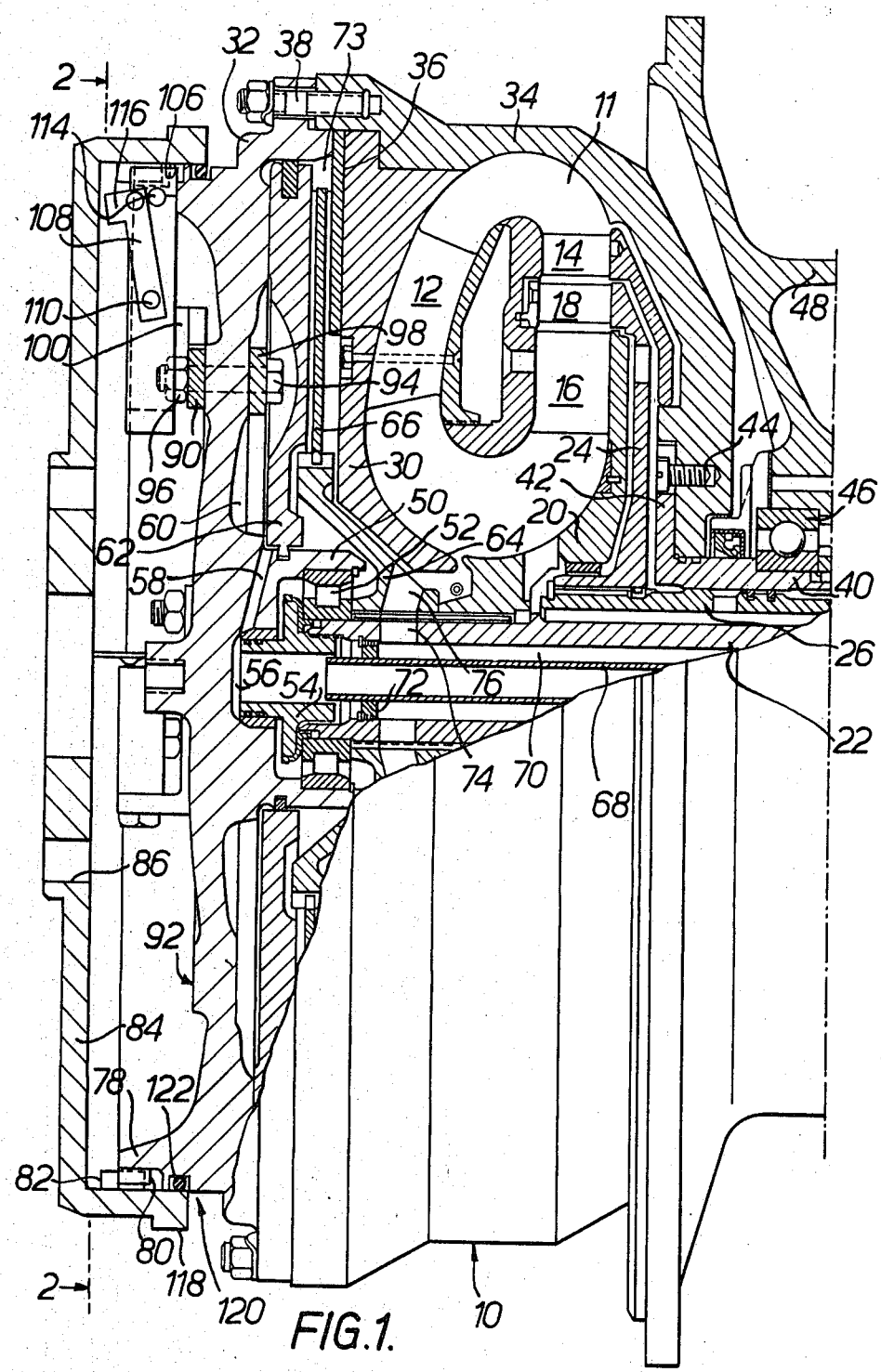
FIG. 1 shows, partly in side elevation and partly in cross-section along the line 1—1 in FIG. 2, the clearance-free serrated coupling between the rotatable housing of a hydrodynamic torque converter and the flywheel of a prime mover, prior to the complete engagement of the serrations.

The hydrodynamic torque converter, shown generally at 10 in FIG. 1 contains within its toroidal fluid filled working chamber 11, a ring of pumping vanes 12, two rings of turbine blades 14 and 16 and a ring of reaction vanes 18. The turbine blade ring 16 is mounted on a turbine rotor 20, carried by an inner hollow shaft 22 and firmly connected thereto. The reaction vane ring 18 is mounted on a reaction rotor 24 carried on a hollow shaft 26 concentrically surrounding the shaft 22 and is firmly and non-rotatably connected with shaft 26. The ring of turbine blades 14 is secured to the ring of turbine blades 16 by means of a core ring 28.

The shafts 22, 26 transmit the torques applied by the fluid in the working chamber 11 to the blade rings 14, 16, 18 to a mechanical gearing (not shown) which may be directly connected to the hydrodynamic torque converter and will be constructed usually in the form of a planetary gearing. From the output shaft of the mechanical gearbox, the torque is transmitted for example to the drive wheels of a motor vehicle, during the forward travel of which the turbine shaft 22 is usually rigidly connected with the output shaft of the mechanical gearing.

The pump vane ring 12 of the torque converter 10 is mounted on a pump rotor 30, fixed between a front housing cover 32 and a rear housing cover 34 with interposition of an annular washer 36 by means of screws 38. The rear housing cover 34 is mounted on a third hollow shaft 40, with the flanged portion 42 of which the housing cover 34 is connected by screws as at 44. The shaft 40 is carried in a ball bearing 46 in a stationary flanged housing 48 of the mechanical gearing.

The front housing cover 32 has an inwardly directed hub-shaped portion 50 receiving a needle roller bearing 52 located on the front end of the turbine shaft 22. A flanged sleeve 54 screwed into the forward end of the turbine shaft 22 retains the roller bearing 52 in position on the turbine shaft 22 and projects with its outer end sealingly into an expanded blind centre bore 56 of the front housing cover 32, from which bore at least one substantially radially directed channel 58 leads into a working chamber 60 inside the housing shell 32, and closed by an annular piston 62 guided axially displaceably on the hub-shaped portion 50.

Between the roller bearing 52 and the turbine rotor 20, the turbine shaft 22 carries a firmly fixed spur coupling gear 64 which carries an internally toothed coupling disc 66 having friction linings on both faces, and adapted to be pressed by the annular piston 62 into frictional engagement with the annular washer 36 serving as counter coupling disc.

Within the turbine shaft 22, there is a centre tube 68 the front end of which projects into the flanged sleeve 54. The channel formed between the outer wall of the tube 68 and the inner wall of the hollow turbine shaft 22, and shown at 70, is sealed at the front end by a piston seal 72 against the interior of the tube 68 and flanged sleeve 54 and communicates continuously through radial holes 74 in the turbine shaft 22 and radial holes 76 in the gear 64 with the working chamber 11 of the hydrodynamic torque converter 10 and with the chamber 73 on the outside of the annular piston 62, receiving the coupling disc 66.

The coupling disc 66 and the counter disc 36 form together a direct coupling, through which the pumping section and the turbine section of the hydrodynamic torque converter may be mechanically connected. With converter operation of the hydrodynamic torque converter, the working chamber 11 of the hydrodynamic torque converter 10 and the chamber 73 receiving the coupling disc 66 are held under a certain fluid pressure, applied from a fluid pressure source, not shown, through the channel 70 and the radial holes 74, 76. During this time, the working chamber 60 on the rear side of the annular piston 62 is vented through the radial bores 58, the blind bore 56 and the interior of the centre tube 68.

If the direct coupling is to be engaged and the converter disengaged, the working chamber 60 is supplied with fluid under pressure through the centre tube 68, the blind bore 56 and the radial bore 58, while the working chamber 11 of the hydrodynamic torque converter 10 and the chamber 73 are vented via the channel 70, causing the annular piston to press the coupling disc 66 against its associated disc 36.

Figure 2:
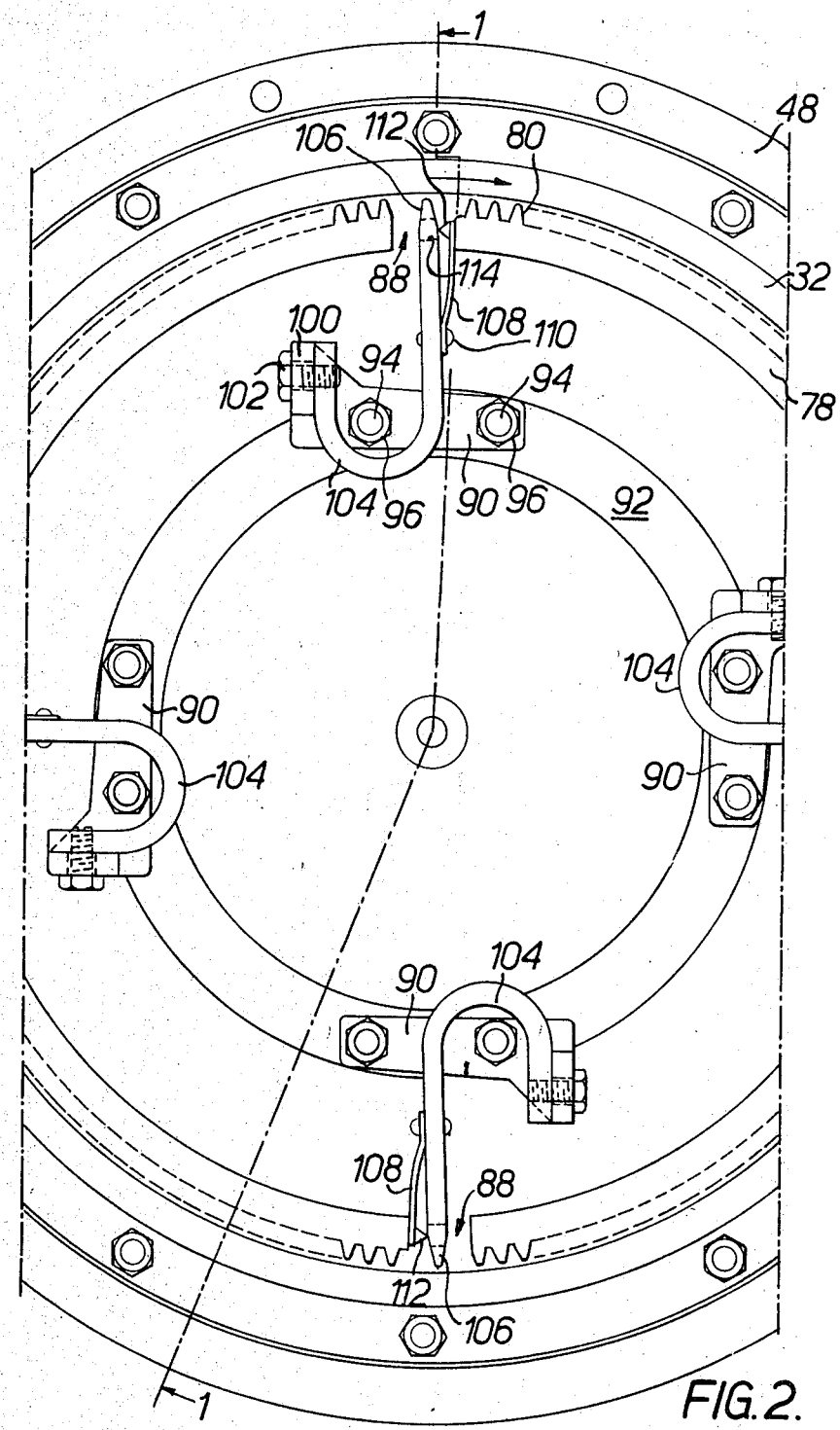
FIG. 2 is a partly broken away end view of the driving end of the hydrodynamic torque converter along the line 2—2 in FIG. 1, the flywheel having been omitted for the sake of clarity of the drawing.

As may also be seen from FIGS. 1 and 2, the front coupling cover 32 carries on its end face an axially projecting collar 78 having an external toothing 80, adapted to the internal toothing 82 of a conventional pot or dish-shaped flywheel 84. The flywheel 84 has screw holes 86 for screwing on the flanged shaft end of a prime mover, for example, of an internal combustion engine.

Figure 4:
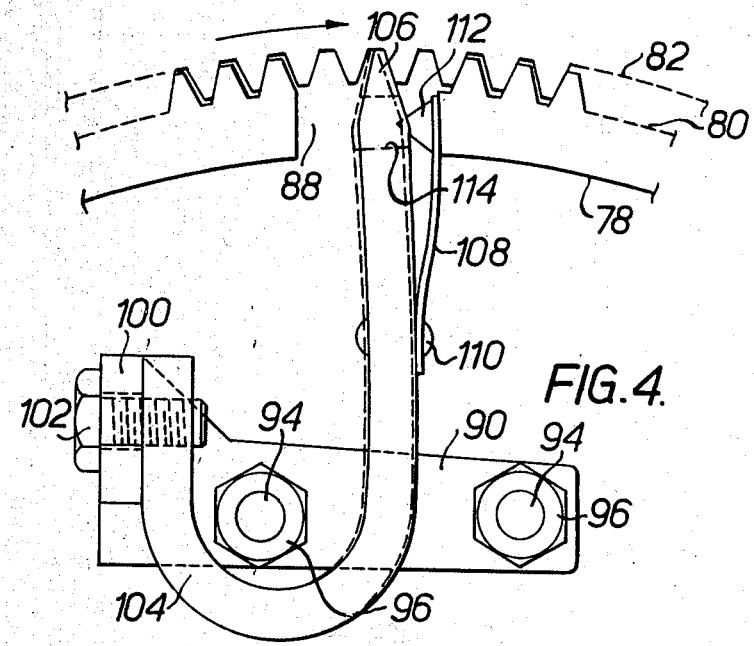
FIG. 4 is a section of FIG. 2 on an enlarged scale.

As indicated in FIG. 2, the collar 78 has, for example, four recesses 88, equidistantly distributed over its periphery. A corresponding number of brackets 90 is screwed by screws 94 and nuts 96 onto a projecting annular face 92 of the front housing cover 32. The passages for the screws 94 through the bores in the housing cover 32 are sealed on the inside thereof by an annular gasket 98. Each bracket has an outwardly angled portion 100 to which is fixed by a screw 102 one end of a U-shaped bent spring 104 formed of spring steel of rectangular cross-section. The extended free legs of the springs 104 extend into the recesses 88 of the collar 78 and are chamfered at the ends 106 in the shape of teeth, at least on the outer side, pointing to the right in FIGS. 2 and 4. The tooth-shaped chamfered ends 106 are located on the pitch circle of the outer toothing 80 and each replaces a tooth flank of the external toothing 80 in the zone of a recess 88. The direction of the torque transmitted by the flywheel to the converter housing is indicated in FIGS. 2 and 4 by an arrow. In the meshing state of the toothing 80, 82, the U-shaped springs 104 are so biased that they tend to spread. In this position, shown in FIG. 4 in solid lines, the bent springs 104 exert on the internal toothing 82 a force in the direction of the torque transmitted from the flywheel to the converter housing, whereby the toothing 80, 82 is urged into an abutment of their tooth flanks corresponding to the direction of the torque to be transmitted. This engagement is maintained by the springs 104 even when the driving torque drops to zero or reaches negative values, insofar as these negative values do not exceed the contact pressure moment exerted by the bent springs 104.

In order to facilitate the intermeshing of the toothings, the bent springs 104 have spring tongues 108 pivotably mounted thereon by rivets 110. The spring tongues 108 have on their ends, which also project into the recesses 88, riveted lugs 112, which, in the position of the spring tongues 108 shown in FIG. 3, engage with recesses or apertures 114 in the bent springs 106, as shown by solid lines in FIG. 4. At the same time, in view of their own small elasticity, the spring tongues abut against the end walls of the recesses 88.

Prior to the intermeshing of the toothings 80, 82, the spring tongues 108 are pivoted through a small angle away from the front cover 32, as shown in FIG. 1, so that the projections 112 bear adjacent to the perforations 114 against the surface of the bent springs 104, whilst continuing to bear rearwardly against the end wall of the recess 88. Thus, as shown in FIG. 4 in dotted lines, the springs 104 are additionally biased to such an extent that the chamfered springs ends assume a position corresponding exactly to the pitch of the external toothing 80. In this position the serrations or teeth can be engaged without difficulty.

Figure 3:
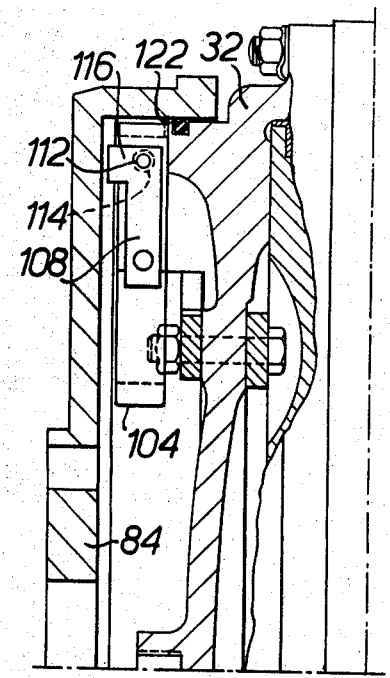
FIG. 3 is a part of FIG. 1 after the final engagement of the serrations.

In order to remove again the additional bias of the springs 104 after the meshing of the serrations, the spring tongues 108 are fitted with lugs 116 directed away from the cover 32. As shown in FIG. 1, the lugs 116 are actuated during the meshing of the serrations, just after the interengagement of the teeth, by the inner end face of the flywheel 84 and the spring tongues 108 are pressed back during the subsequent interengagement so that the lugs 112 snap into the perforations 114, as shown in FIG. 3, and release the springs 104 for exerting a bias on the inner toothing 80.

As may be seen from FIG. 1, the flywheel 84 has outside the internal toothing 82 a radially outwardly reinforced collar-shaped projection 118 which overlies a cylindrical sealing surface 120 on the collar 78 of the cover member 32. An O-ring 122 is fitted into an annular groove in the cylindrical surface 120 and bears tightly against the inner cylindrical surface of the collar 118. By means of this arrangement, the space between the flywheel 84 and the housing shell 32, containing the serrations 80, 82, is sealed towards the outside, and may be filled with lubricating oil for lubricating the tooth flanks. Due to the rotation during operation, relatively small amounts of oil are sufficient to supply all the serrations sufficiently with lubricating oil.

In the embodiment of FIGS. 1 to 4, the tooth flanks of the serrations 80, 82, are straight and the flank angles coincide. Hence, the mutually contacting tooth flanks rest on each other with their entire surfaces when the flywheel 84 and the hydrodynamic torque converter are accurately centered relative to each other. The position is maintained by virtue of the biasing forces of the springs 104, even in the absence of driving torque.

Figure 5:
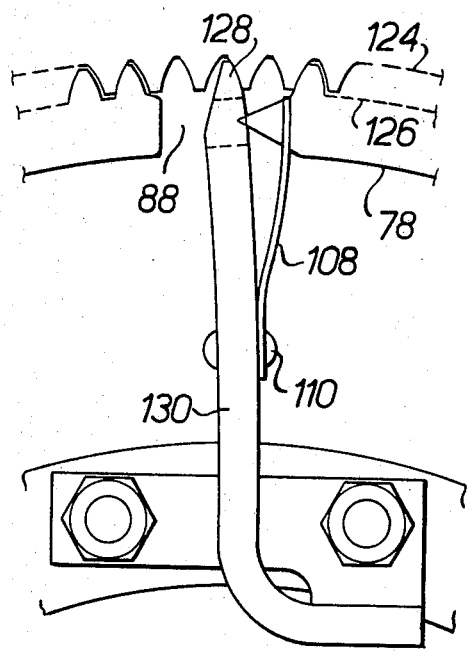
FIG. 5 is a view similar to that in FIG. 4 but showing a modified embodiment of the invention.

FIG. 5 shows a modified embodiment of the invention with evolute tooth flanks on the serrations 124, 126. Correspondingly also the flank pointing in the direction of the biasing of the spring end 128 of each spring 130 has evolute configuration. However, this evolute is more strongly curved and corresponds to the shape of the tooth flank of a spur gear with the centre of rotation 132, forming the ideal pivoting centre of the spring 130. This ensures that the end 128 of the spring 130 always makes flank contact with the internal toothing 124 between the tooth tip and the tooth root. Differing from the embodiment according to FIGS. 1 to 4, the spring 130 in the embodiment of FIG. 5 is made in one piece with the bracket and is bent only through an angle of 90°.

This invention is not limited to the constructions and examples of use shown in the drawing and hereinbefore described, but may be modified within the scope of the principle of the invention. More particularly, the construction of the torque converter shown in the drawing is not an essential for the application of the invention, and the torque converter may, in fact have any construction. Moreover, the invention is applicable for use with any other serration coupling between two coaxially rotatable elements.

I claim:

1. In a transmission shafting of the type which rotates unidirectionally and which includes intermeshing serrated coupling members rotatable about an axis and disposed between and operatively interconnecting elements of said shafting, which members are axially displaceable relative to each other, means for substantially eliminating peripheral play between said serrated coupling members comprising at least one flank element forming a part of the flank of a serration of at least one of the intermeshing serrated members, and said flank element being a radially extending spring element arranged to exert a biasing force primarily in a tangential direction relative to said axis such that the biasing force is substantially independent of the speed of rotation of the members, for substantially maintaining the serrations of the serrated members in constant mesh in the normal driving direction.

2. A device as claimed in claim 1, wherein the transmission is adapted to be mounted on a vehicle, and wherein the serrated coupling members are disposed, respectively, on a rotating housing of a hydrodynamic torque converter carrying pump vanes and adapted to be in driving engagement with the wheels of the vehicle, and on a flywheel of a prime mover, and wherein the flank element is a spring element and the bias thereof corresponds at least to the braking torque to be transmitted when said prime mover is used for braking the vehicle torque through the torque converter.

3. A device as claimed in claim 1, wherein the flank profiles of the serrations are curved and at least one of the coupled members is floatingly mounted and wherein the bias of the spring elements is made sufficiently large so that the centering force exerted by said spring element exceeds the unbalanced force caused by said floatingly mounted member.

4. A device as claimed in claim 3 wherein the profile of the flanks of the serrations are evolute and the tooth flanks carried by the spring elements have an evolute profile corresponding to the profile of the tooth flanks of a spur gear supported at the ideal pivotal center of said spring elements.

5. A device as claimed in claim 1 wherein the serrations have a straight flank profile with corresponding flank angles on the serrations of both serrated coupling members.

6. A device as claimed in claim 1 wherein said serrated coupling members are located one within the other, the outer member having inwardly directed serrations and the inner member having outwardly directed serrations, said flank element being a spring element, and wherein the tooth flanks carried by the spring elements form a part of the outwardly directed serrations of the inner member.

7. A device as claimed in claim 1, wherein the said serrated coupling members are located one within the other, the outer member having inwardly directed serrations and the inner member having outwardly directed serrations, said flank element being a spring element, and wherein the member having inwardly directed serrations overlies the member having the outwardly directed serrations by means of a projection integral with the inwardly directed serrations.

8. A device as claimed in claim 7 wherein the projection cooperates with a sealing ring arranged on the other coupling member.

9. A device as claimed in claim 1 wherein said flank elements are spring elements formed as U-shaped springs projecting into recesses of the member on which they are carried, said flanks including a straight free end formed at least on one side as the profile of a flank of said serrations.

10. A device as claimed in claim 1, said flank elements being spring elements and including adjustable abutment means for biasing the spring elements against their normal operating bias to facilitate the intermeshing of the serrations of the serrated coupling members.

11. A device as claimed in claim 10 including means for displacing said abutment means into an inoperative position automatically after the first engagement of the serrations during meshing.

12. A device as claimed in claim 11 wherein the abutment means comprises levers arranged on the spring elements so as to be pivotal in the axial direction of the serrations, said levers being swingable during meshing of the serrations, by the action of the serrated coupling member other than that carrying the levers, from a position in which the abutment means urge the spring elements away from an abutment surface to a position whereat they release the spring elements.

13. A device as claimed in claim 12 wherein the pivotal levers are of a resilient material and carry protrusions at their free ends located in the said recesses of its respective serrated coupling member, said protrusions being arranged to engage in holes formed in said spring elements during meshing of the serrations.

14. A torque transmitting apparatus comprising driving and driven rotating members, each member having a circular set of serrations, the sets of serrations of the two members being coaxial and intermeshing with each other with spacing between the serrations of the two sets in the peripheral direction relative to the axis of the two members, such that torque is normally transmitted from first surfaces of the serrations of the driving member to first surfaces of corresponding serrations of the driven member, at least one of said sets of serrations including at least one spring element biased primarily in the tangential direction relative to said axis such that the bias force is substantially independent of the speed of rotation of the members such that its first surface is urged away from the first surface of its corresponding serration of the other set, said biased flank thus causing the remaining serrations of that set into normal torque engaging contact with the serrations of the other set wherein their first surfaces engage the first surfaces of the serrations of the other set.

15. A torque transmitting apparatus according to claim 14, said flank elements being spring elements and including an adjustable abutment means for biasing the spring elements against their normal operating bias to facilitate the intermeshing of serrations of the two members.

16. A torque transmitting apparatus according to claim 15 wherein the abutment means comprises levers arranged on the spring elements so as to be pivotal in the axial direction of the serrations, said levers being swingable during meshing of the serrations from a position in which the abutment means urges the spring elements away from the abutment surface to a position whereat the abutment means releases the spring elements.

17. A torque transmitting apparatus according to claim 16 wherein the pivotal levers are of a resilient material and carry protrusions at their free ends located in the said recess of its respective serrated member, said protrusions being arranged to engage in holes formed in said spring elements during meshing of the serrations.

References Cited

UNITED STATES PATENTS

| 1,611,608 | 12/1926 | Psilander | 64—6 X |
|---|---|---|---|
| 2,615,315 | 10/1952 | Werner | 64—27 X |
| 3,008,312 | 11/1961 | Jacobus | 64—9 |
| 3,020,775 | 2/1962 | Musser | 64—27 X |
| 3,373,625 | 3/1968 | Keller | 64—27 X |

FOREIGN PATENTS 977,883   12/1964   Great Britain.

JAMES A. WONG, Primary Examiner

U.S. Cl. X.R.

64—27